(12) United States Patent
Arsenault et al.

(10) Patent No.: US 7,877,290 B1
(45) Date of Patent: Jan. 25, 2011

(54) SYSTEM AND METHOD FOR TRANSMITTING, RECEIVING AND DISPLAYING ADVERTISEMENTS

(75) Inventors: Robert G. Arsenault, Redondo Beach, CA (US); Tam T. Leminh, Cypress, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 599 days.

(21) Appl. No.: 09/492,725

(22) Filed: Jan. 27, 2000

Related U.S. Application Data

(60) Provisional application No. 60/126,927, filed on Mar. 29, 1999.

(51) Int. Cl.
*G06Q 30/00* (2006.01)
*G05B 19/418* (2006.01)

(52) U.S. Cl. .................. 705/14.4; 709/217; 725/42; 725/14

(58) Field of Classification Search .................. 705/14, 705/14.4; 709/217; 725/42, 14
See application file for complete search history.

(56) References Cited

U.S. PATENT DOCUMENTS

| | | | |
|---|---|---|---|
| 4,694,490 A | 9/1987 | Harvey et al. | |
| 5,153,580 A | 10/1992 | Pollack | |
| 5,251,332 A | 10/1993 | Hansen | |
| 5,260,778 A | 11/1993 | Kauffman et al. | |
| 5,319,707 A | 6/1994 | Wasilewski et al. | |
| 5,345,594 A | 9/1994 | Tsuda | |
| 5,410,344 A | 4/1995 | Graves et al. | |
| 5,412,416 A * | 5/1995 | Nemirofsky | 725/36 |
| 5,440,632 A | 8/1995 | Bacon et al. | |
| 5,446,919 A | 8/1995 | Wilkins | |
| 5,497,206 A | 3/1996 | Ji | |
| 5,559,548 A | 9/1996 | Davis et al. | |
| 5,563,648 A | 10/1996 | Menand et al. | |
| 5,583,562 A | 12/1996 | Birch et al. | |
| 5,583,563 A | 12/1996 | Wanderscheid et al. | |
| 5,589,892 A | 12/1996 | Knee et al. | |
| 5,603,077 A | 2/1997 | Muckle et al. | |
| 5,619,250 A | 4/1997 | McClellan et al. | |

(Continued)

FOREIGN PATENT DOCUMENTS

EP     1 030 463 A2    6/2000

(Continued)

OTHER PUBLICATIONS

McMullen et al. (02033913 Supplier No. 03291182), "Compatibility and portability": Computers & Electronics, v22, p. 80(4): Jun. 1984.*

*Primary Examiner*—John G Weiss
*Assistant Examiner*—M. Victoria Vanderhorst

(57) ABSTRACT

Digital data objects containing video-based advertisement information are broadcast via satellite and received by one or more integrated receiver decoders (IRDs). Each IRD selectively discards or caches advertisement objects (AOs) in a local memory. AOs that are incompatible with the sophistication level of the IRD and/or user preferences/characteristics are discarded without being cached and AOs that have a lower priority than currently cached AOs are discarded. The IRD arranges cached AOs into ordered lists to schedule them for display and each ordered list corresponds to a unique display position within a program guide. When the user initiates a program guide session, the IRD cyclically displays the AOs in the program guide according to the ordered lists.

44 Claims, 9 Drawing Sheets

U.S. PATENT DOCUMENTS

| | | | |
|---|---|---|---|
| 5,625,693 A | | 4/1997 | Rohatgi et al. |
| 5,625,864 A | | 4/1997 | Budow et al. |
| 5,627,549 A | * | 5/1997 | Park .................. 701/300 |
| 5,631,903 A | | 5/1997 | Dianda et al. |
| 5,635,978 A | | 6/1997 | Alten et al. |
| 5,636,357 A | * | 6/1997 | Weiner .................. 711/115 |
| 5,666,293 A | | 9/1997 | Metz et al. |
| 5,671,411 A | | 9/1997 | Watts et al. |
| 5,686,954 A | | 11/1997 | Yoshinobu et al. |
| 5,724,521 A | | 3/1998 | Dedrick |
| 5,734,589 A | | 3/1998 | Kostreski et al. |
| 5,740,549 A | * | 4/1998 | Reilly et al. .................. 705/14 |
| 5,742,680 A | | 4/1998 | Wilson |
| 5,760,820 A | | 6/1998 | Eda et al. |
| 5,767,913 A | | 6/1998 | Kassatly |
| 5,768,539 A | | 6/1998 | Metz et al. |
| 5,774,170 A | * | 6/1998 | Hite et al. .................. 725/34 |
| 5,798,785 A | | 8/1998 | Hendricks et al. |
| 5,838,314 A | | 11/1998 | Neel et al. |
| 5,848,397 A | * | 12/1998 | Marsh et al. .................. 705/14 |
| 5,864,747 A | | 1/1999 | Clark et al. |
| 5,886,995 A | | 3/1999 | Arsenault et al. |
| 5,892,508 A | | 4/1999 | Howe et al. |
| 5,892,536 A | | 4/1999 | Logan et al. |
| 5,892,683 A | * | 4/1999 | Sung .................. 703/27 |
| 5,894,320 A | | 4/1999 | Vancelette |
| 5,909,437 A | | 6/1999 | Rhodes et al. |
| 5,923,362 A | | 7/1999 | Klosterman |
| 5,940,737 A | | 8/1999 | Eastman |
| 5,951,639 A | | 9/1999 | MacInnis |
| 5,978,037 A | | 11/1999 | Hilpert et al. |
| 5,978,855 A | | 11/1999 | Metz et al. |
| 5,983,242 A | * | 11/1999 | Brown et al. .................. 707/203 |
| 6,005,597 A | | 12/1999 | Barrett et al. |
| 6,009,116 A | | 12/1999 | Bednarek et al. |
| 6,009,307 A | | 12/1999 | Granata et al. |
| 6,011,597 A | | 1/2000 | Kubo |
| 6,023,727 A | * | 2/2000 | Barrett et al. .................. 709/221 |
| 6,029,045 A | | 2/2000 | Picco et al. |
| 6,047,317 A | * | 4/2000 | Bisdikian et al. .................. 725/142 |
| 6,052,554 A | | 4/2000 | Hendricks et al. |
| 6,064,376 A | | 5/2000 | Berezowski et al. |
| 6,067,107 A | | 5/2000 | Travaille |
| 6,067,440 A | | 5/2000 | Diefes |
| 6,084,628 A | | 7/2000 | Sawyer |
| 6,101,171 A | | 8/2000 | Yoshida et al. |
| 6,133,909 A | | 10/2000 | Schein et al. |
| 6,157,411 A | | 12/2000 | Williams et al. |
| 6,160,546 A | | 12/2000 | Thompson et al. |
| 6,160,988 A | | 12/2000 | Shroyer |
| 6,166,728 A | | 12/2000 | Haman et al. |
| 6,169,877 B1 | | 1/2001 | Gulla' |
| 6,172,674 B1 | | 1/2001 | Etheredge |
| 6,172,972 B1 | | 1/2001 | Birdwell et al. |
| 6,177,931 B1 | | 1/2001 | Alexander et al. |
| 6,208,636 B1 | | 3/2001 | Tawil et al. |
| 6,209,129 B1 | | 3/2001 | Carr et al. |
| 6,212,682 B1 | | 4/2001 | Kuno |
| 6,216,265 B1 | | 4/2001 | Roop et al. |
| 6,240,555 B1 | | 5/2001 | Shoff et al. |
| 6,263,506 B1 | | 7/2001 | Ezaki et al. |
| 6,282,713 B1 | | 8/2001 | Kitsukawa et al. |
| 6,310,661 B1 | | 10/2001 | Arsenault |
| 6,331,876 B1 | | 12/2001 | Koster et al. |
| 6,331,979 B1 | | 12/2001 | Dillon et al. |
| 6,348,932 B1 | | 2/2002 | Nishikawa et al. |
| 6,363,525 B1 | | 3/2002 | Dougherty et al. |
| 6,408,437 B1 | | 6/2002 | Hendricks et al. |
| 6,426,779 B1 | | 7/2002 | Noguchi et al. |
| 6,430,165 B1 | | 8/2002 | Arsenault |
| 6,460,181 B1 | | 10/2002 | Donnelly |
| 6,462,784 B1 | | 10/2002 | Kohno et al. |
| 6,463,468 B1 | | 10/2002 | Buch et al. |
| 6,469,753 B1 | | 10/2002 | Klosterman et al. |
| 6,481,010 B2 | | 11/2002 | Nishikawa et al. |
| 6,588,013 B1 | | 7/2003 | Lumley et al. |
| 6,675,384 B1 | | 1/2004 | Block et al. |
| 6,706,290 B1 | * | 3/2004 | Kajander et al. .................. 424/616 |
| 6,738,978 B1 | | 5/2004 | Hendricks et al. |
| 6,876,974 B1 | * | 4/2005 | Marsh et al. .................. 705/14.44 |
| 7,493,640 B1 | * | 2/2009 | Derrenberger et al. .................. 725/42 |
| 2001/0007149 A1 | * | 7/2001 | Smith .................. 725/14 |
| 2002/0010930 A1 | | 1/2002 | Shaz-Nazaroff |
| 2002/0049972 A1 | | 4/2002 | Kimoto |
| 2002/0059602 A1 | | 5/2002 | Macrae et al. |
| 2002/0066071 A1 | * | 5/2002 | Tien et al. .................. 717/102 |
| 2002/0069413 A1 | * | 6/2002 | Levitan .................. 725/51 |
| 2002/0073424 A1 | | 6/2002 | Ward, III et al. |
| 2002/0092017 A1 | | 7/2002 | Klosterman et al. |
| 2002/0095676 A1 | | 7/2002 | Knee et al. |
| 2002/0120933 A1 | | 8/2002 | Knudson et al. |
| 2003/0025807 A1 | * | 2/2003 | Roberts et al. .................. 348/231.7 |
| 2003/0135853 A1 | | 7/2003 | Goldman et al. |

FOREIGN PATENT DOCUMENTS

| | | | |
|---|---|---|---|
| WO | WO 97/12486 | * | 4/1997 |
| WO | 97/17774 | | 5/1997 |
| WO | WO 97/41673 | * | 11/1997 |
| WO | 99/04561 | | 1/1999 |

* cited by examiner

SYSTEM AND METHOD FOR TRANSMITTING, RECEIVING AND DISPLAYING ADVERTISEMENTS

RELATED APPLICATION

This application claims priority from provisional application Ser. No. 60/126,927, filed Mar. 29, 1999.

BACKGROUND OF THE INVENTION (a) Field of the Invention

The invention relates generally to digital video transmission systems and, more particularly, to a system and method of transmitting, receiving and displaying advertisements via a digital video transmission system.

(b) Description of Related Art

The use of video-based advertising is growing rapidly, which is due, in part, to the large number of consumers that now have access to the Internet. To capitalize on this growth, many Internet service providers (ISPs) sell advertising space (i.e., graphic blocks) on their home page display, through which customers must navigate when connecting to the Internet. Similarly, many businesses profit from selling advertising space on their webpages to other companies that offer complementary or related products and services.

Television distribution systems have also expanded the use of video-based advertising. For example, many cable television service providers sell advertising space in their electronic program guide display. These program guides are typically a grid-based display having vertical columns representing time blocks, rows representing individual channels, and individual cells which represent video programs. Each video program occupies one or more cells in a given row and may be represented using various graphic and textual information that is descriptive of the programs. Viewers access the program guide via a dedicated channel and may spend a significant amount of time viewing the guide to plan their future viewing and/or to select a currently running program.

The advertising spaces provided within the conventional video-based systems discussed above are typically sold as graphic blocks or banners. These advertising spaces may be strategically arranged within the display and may include still color images, textual information, and limited animation. Additionally, a large number of advertisements may be scheduled to share a limited number of available spaces for different lengths of time. Thus, if a user views the display for a sufficient amount of time, some or all of the advertisements may be seen cycling periodically through predetermined locations.

In the above-described conventional video-based systems, the flexibility of the advertisement scheduling is very limited because the scheduling function is performed exclusively at the system headend or transmitting station. Thus, any changes in the display of advertisements (e.g., display location, advertisement content, etc.) must be transmitted in real time from the system headend to the receiver stations of individual users. As a result, all users are shown the same advertisements at the same time regardless of their personal preferences, location, or time zone. Furthermore, the sophistication of the advertisements is constrained by the lowest level of technology currently employed within the group of users. For example, although it may be feasible to transmit advertisements including high resolution animation from the system headend, such sophisticated advertisements may nevertheless not be transmitted because one or more users may have receiver stations that are not capable of processing these sophisticated advertisements.

SUMMARY OF THE INVENTION

In accordance with one aspect of the invention, a data structure for manipulating digital advertisement information within a user interface includes a computer readable medium and a plurality of advertisement data objects stored on the computer readable medium. Each advertisement data object from the plurality of advertisement data objects may be uniquely associated with one advertisement from a plurality of advertisements and each advertisement data object may include data elements associated with the scheduling and display of the one advertisement. An identifier data object may be stored on the computer readable medium. The identifier data object may have data elements including information identifying one or more of the plurality of advertisement data objects that are to be considered for display on the user interface. Additionally, an image data object may be stored on the computer readable medium. The image data object may have data elements including image information and may be linked to one or more advertisement data objects from the plurality of advertisement data objects.

In accordance with another aspect of the invention, a method of displaying advertisements for use in a receiving station having a user interface generates a first ordered list associated with a first advertisement display position of the user interface. The first ordered list may contain a prioritized sequence of advertising objects (AOs). The method may sequentially display advertisements in the first advertisement display position of the user interface using the first ordered list and may discard expired AOs from the first ordered list and insert new AOs into the first ordered list.

The invention itself, together with further objects and attendant advantages, will best be understood by reference to the following detailed description, taken in conjunction with the accompanying drawings.

DESCRIPTION OF THE PREFERRED EMBODIMENTS

Figure 1:
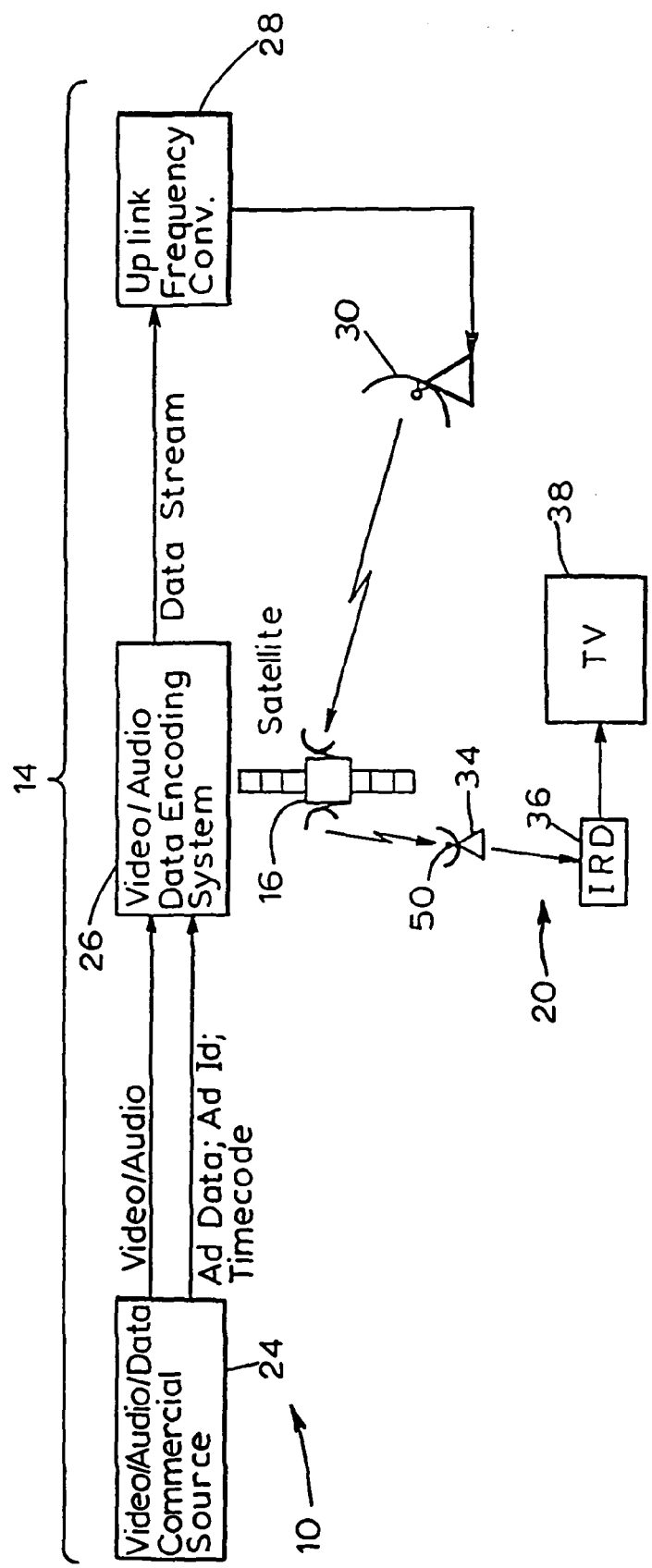
FIG. 1 is an exemplary block diagram of a satellite transmission and reception system that may be used to transmit, receive and display video-based advertisements.

The techniques described herein may be embodied in a wireless distribution system that securely, reliably, and inexpensively distributes digital packetized video, audio, and data to individual users at geographically remote locations. In general, the techniques described herein are best used by digital video broadcast systems involving a large number of users and/or those systems which cover a relatively large geographic area.

Some embodiments may utilize a Direct-to-Home (DTH) satellite broadcast system such as that provided by the DIRECTV® broadcast service. DTH satellite systems have the capability to simultaneously transmit a wide-variety of digital video, audio, and data information. These systems use one or more geosynchronous satellites to broadcast a broadband signal to individual receiver units within a large geographic area. Typically, this broadband signal is composed of a plurality of individual video, audio, and data channels that are sent to a satellite uplink facility.

At the satellite uplink facility, video and audio signals received from a variety of sources may be digitized in known manners, multiplexed with other data signals, compressed (if required), mated with error correction codes, modulated on one or more carriers, and uplinked to a geosynchronous satellite. The satellite amplifies the received signal, shifts the signal to a different carrier frequency band and transmits (downlinks) the frequency shifted signal to earth for reception at individual receiver stations. A plurality of signals at different frequencies and/or polarizations are typically processed.

Some embodiments of the invention may employ a satellite receiving antenna (e.g., a reflective dish and LNB) connected by a cable to a receiver station or integrated receiver/decoder unit (IRD). The satellite antenna is aimed toward the satellites and the IRD is connected to the user's television in a manner similar to a conventional cable-TV decoder. The antenna acquires real-time video programs and periodic data broadcasts that are used by the IRD to, among other things, construct a program guide. These data broadcasts also include advertisement information that is cached in the user's IRD. The advertisement information is locally processed by the IRD to schedule and display video advertisements according to the user's geographic location, preferences/characteristics, and IRD sophistication.

In the IRD, front-end circuitry receives L-band signals from the antenna LNB and converts the L-band signals to the original digital data stream of video, audio, and related data/information signals. The digital data stream is fed to video/audio decoder circuits, which perform the main video/audio processing functions such as demultiplexing and decompression. A microprocessor controls the overall operation of the IRD, including the selection of parameters, the set-up and control of components, channel selection, viewer access to different programming packages, blocking certain channels, and many other functions. The compression and decompression of packetized video and audio signals may be accomplished according to the Motion Picture Expert Group (MPEG) standards for performing digital video/audio compression. Thus, the IRD unit typically includes an MPEG-1 and/or MPEG-2 video/audio decoder in order to decompress the received compressed video/audio.

Typically, the received packets are presented to a transport circuit that is in communication with a microprocessor. The microprocessor informs the transport circuit which packets are of interest. For example, if the IRD is instructed by the user to display the ESPN channel, the microprocessor instructs the transport to receive and process all packets (including particularly the video, audio and data packets) associated with the ESPN programming. The information about how to receive ESPN, or any other programming channel, is provided via the program guide data stream.

Generally speaking, the program guide identifies (based on header information) those packets that must be assembled in order to construct the audio, video and data for any of the available programs. Program guide data also includes information needed to construct a graphical listing of the showtimes and channels for available programming, program description data, program rating data, program category data, and other data. The transport identifies desired ESPN packets by using header information within the packet, strips off the payload portion of the packet, and forwards the payloads to an audio/video decoder (or optionally first to an intermediate storage location). The decoder then stores the payloads in designated memory locations. The ESPN video and audio payloads are then called up from their memory locations as needed, decoded, converted to, for example, NTSC analog signals, or a digital serial or parallel TV signal, and are provided to a television monitor for display.

Along with the audio and video signals associated with video programs, the satellite transmits, via the periodic data broadcasts, various digital objects such as text and graphics. Each digital object typically includes one or more data elements that identify and characterize the object. The IRD may use these data elements to process received objects locally according to the user's preferences/characteristics, geographic location, and/or IRD sophistication. For example, some objects may be discarded rather than cached by a particular user's IRD if the IRD determines, via one or more of the associated data elements, that the object is incompatible with the sophistication level of the IRD. Also, for example, the IRD may receive an object associated with an advertisement and determine the display characteristics of the advertisement by using the data elements associated with that object. In general, as will be discussed in greater detail below, because individual IRDs may have different locally determined characteristics (geographic location, personal preferences, sophistication, etc.) a given advertisement object (AO) may be processed in different manners by individual IRDs.

FIG. 1 is an exemplary block diagram of a satellite transmission and reception system 10 that may be used to transmit, receive and display video-based advertisements. The system 10 includes a transmission station 14, a relay 16, and a plurality of receiver stations, one of which is shown at reference numeral 20. A wireless airlink provides the communications medium between the transmission station 14, the relay 16, and the receiver station 20. The transmission station 14 includes a programming/data source 24, a video/audio/data encoding system 26, an uplink frequency converter 28, and an uplink satellite antenna 30. The relay 16 may be one or more geosynchronous satellites. The receiver station 20 includes a satellite reception antenna 34, which may include a low-noise-block (LNB) 50, a receiver unit (or IRD) 36 connected to the LNB 50, and a television monitor 38 connected to the receiver unit 36.

In operation, the transmission station 14 can receive video and audio programming from a number of sources, including satellites, terrestrial fiber optics, cable, or tape. The received programming signals, along with data signals such as electronic scheduling data, conditional access data, and advertisement data are sent to the video/audio/data encoding system 26 where they are digitally encoded and multiplexed into a packetized data stream using a number of conventional algorithms, including convolutional error correction and compression. In a conventional manner, the encoded data stream is modulated and sent through the uplink frequency converter 28, which converts the modulated encoded data stream to a frequency band (e.g., Ku-band) suitable for reception by the satellite 16. The modulated, encoded data stream is then routed from the uplink frequency converter 28 to an uplink satellite antenna 30 where it is broadcast toward the satellite 16 over the airlink. The satellite 16 receives the modulated, encoded Ku-band data stream and re-broadcasts it downward toward an area on earth that includes the various receiver stations 20. The LNB 50 shifts the Ku-band signal down to an L-band signal, which is transmitted to the receiver unit 36.

Figure 2:
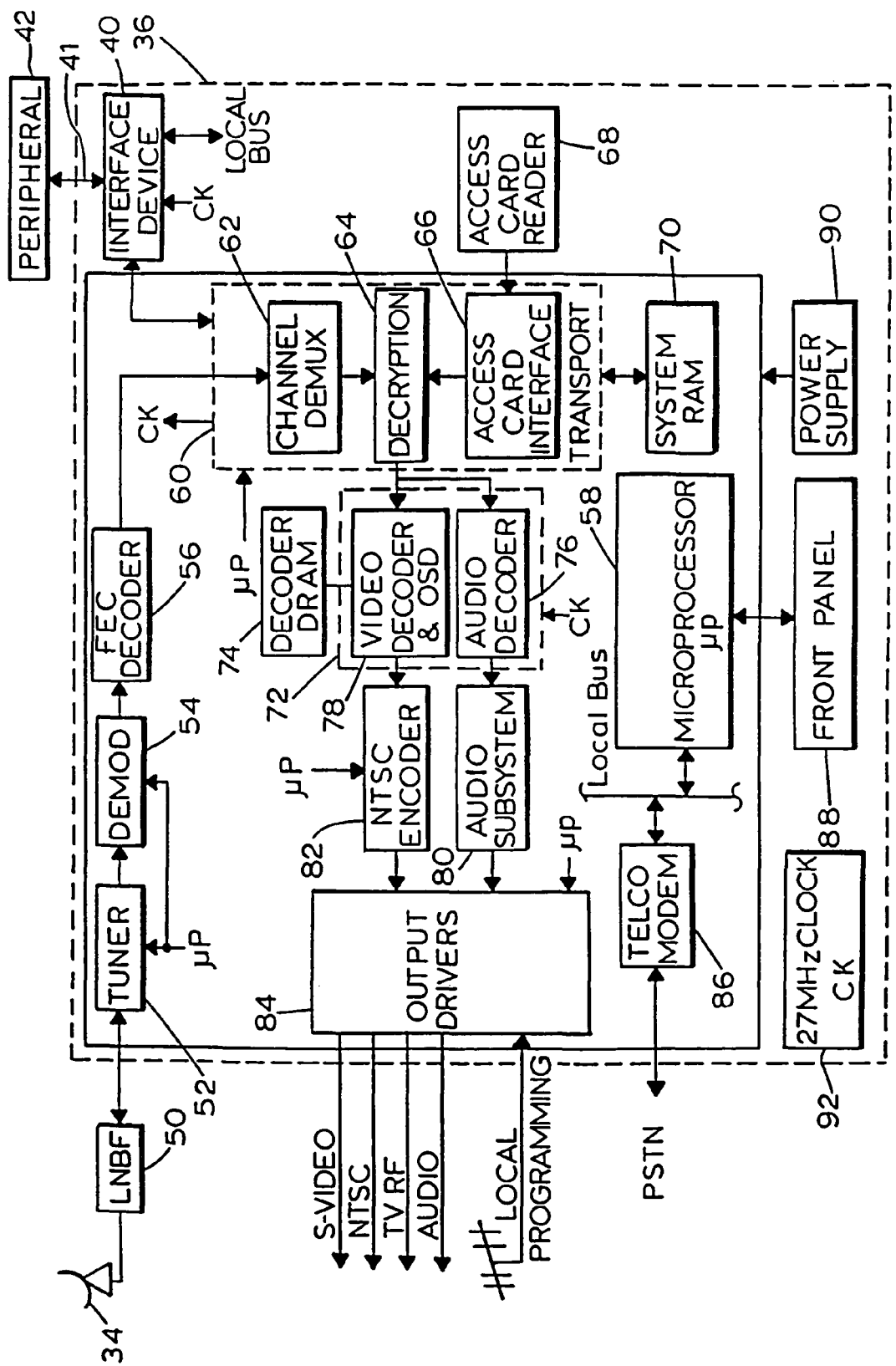
FIG. 2 is a detailed schematic block diagram of the integrated receiver decoder (IRD) shown in FIG. 1.

FIG. 2 is a detailed schematic block diagram of the IRD 36 shown in FIG. 1. Front-end circuitry inside the IRD 36 receives the L-band RF signals from the LNB 50 and converts them back into the original digital data stream. Decoding circuitry receives the original data stream and performs video/audio processing operations such as demultiplexing and decompression. A microprocessor or CPU 58 controls the overall operation of the IRD 36, including the selection of parameters, the set-up and control of components, channel selection, access to different movie packages, and many other functions. Additionally, the microprocessor 58 controls how digital objects (e.g., text, graphics, etc.) are processed (e.g., stored, displayed, etc.).

The IRD 36 includes a tuner 52, demodulator 54, FEC decoder 56, a microprocessor 58, a transport circuit 60, a channel demultiplexer 62, decryption circuit 64, an access card interface 66, an access card reader 68, a system random-access-memory (RAM) 70, an audio/video decoder circuit 72 having a dynamic random access memory (DRAM) 74, an audio decoder 76, and a video decoder 78, an audio digital-to-analog circuit 80, an NTSC (or other) encoder 82, output drivers 84, a modem connection 86, a front panel user interface 88, and a power supply 90, coupled together as illustrated. A 27 megahertz (MHZ) clock signal generator 92 is also provided. The clock generator 92 generates a clock signal CK that is coupled to the audio/video decoder circuit 72 and which is frequency-calibrated by a signal received from the transport circuit 60.

The transport 60 receives the transport stream of digitized data packets containing video, audio, data, scheduling information, and other data. The digital packet information contains identifying headers as part of its overhead data. Under control of the microprocessor 58, the channel demultiplexer 62 filters out packets that are not currently of interest and routes the data packets that are of interest through the decryption circuit 64 and, in the case of some packets, also through the access control circuits 66 and 68 to their proper downstream destination. The decryption circuit 64 provides decryption for the data packets that have been encrypted. The access control circuits 66 and 68 provide access control by any conventional means. For example, access control may be achieved by requiring a data packet to have a proper authorization code in order to be passed to the decryptor 64 and/or video decoder 78. The access card reader 68 can interface with an access card (not shown) that will receive the packet authorization code, determine its validity and generate a code that confirms to the transport 60 that the subject data packet is authorized.

The authorized data of interest, which now consists of the payload portions of the received data packets, are forwarded to decoder DRAM 74 for buffering and may optionally be temporarily stored in system RAM 70. The audio/video decoder 72 decodes the payloads stored in DRAM 74 as needed. The requested data is routed from the RAM 70 through the transport 60 to the audio/video decoder 72. At that time, the data is routed to the video decoder 78 (which includes display generating circuitry) and the NTSC (or other) encoder 82. The video decoder 78 reads in the compressed video data from the DRAM 74, parses this video data, creates quantized frequency domain coefficients, and then performs an inverse quantization, inverse discrete cosine transform (DCT) and motion compensation. At this point, an image has been reconstructed in the spatial domain. This image is stored in a frame buffer within the DRAM 74. At a later time, the image is read out of the frame buffer within DRAM 74 and is passed through the display circuitry to the encoder 82. The display circuitry (located in the video decoder 78) generates the graphics that allow text such as the electronic program guide data and video advertisements to be displayed. The encoder 82 converts the digital video signals to analog signals according to the NTSC standard or to other desired output protocols (e.g., ATSC), thereby allowing video to be received by a conventional television 38 or other video output device (FIG. 1).

In addition to audio and video data packets associated with currently running programs, the IRD 36 receives one or more data packet streams that contain digital objects associated with the program guide and advertisements. The satellite 16 may transmit the program guide and advertising objects (AOs) on more than one transponder so that the IRD 36 has ready access to this information regardless of the identity of the transponder to which the IRD 36 is currently tuned.

Additionally, the program guide objects and AOs include data elements that characterize the objects and that may be linked to other digital objects containing image information such as text and graphics. The IRD 36 uses these data elements, along with the image information, to construct and display a program guide and to schedule and display video advertisements within the program guide.

Generally speaking, the techniques described herein provide a system and method for locally optimized processing of AOs. Each AO includes one or more data elements or digital bit fields that characterize the AO and the AOs may be linked to one or more HTTP objects (HOs) that contain image and textual data, which may be displayed in connection with the AOs. Additionally, a given HO may be linked to one or more of the AOs. Linking image information to AOs through HOs provides a flexible and efficient system and method of transmitting, receiving, storing and displaying video-based advertisements because image information does not have to be embedded within each of the AOs (i.e., duplicated).

The IRD 36 receives an update list object (ULO) that provides information to the IRD 36 regarding which AOs are currently available and which must be processed and considered for local storage/display by the IRD 36. The IRD 36 may be adapted to discard locally cached AOs (and associated HOs) that are not contained in the ULO and the IRD 36 may further select for local storage those AOs in the ULO that are not currently cached in the memory 70. The IRD 36 receives the ULO, AOs and HOs and then locally processes them based on the data elements within these objects, the user's preferences/characteristics, geographic location, and the sophistication level of the IRD 36.

Figure 3A:
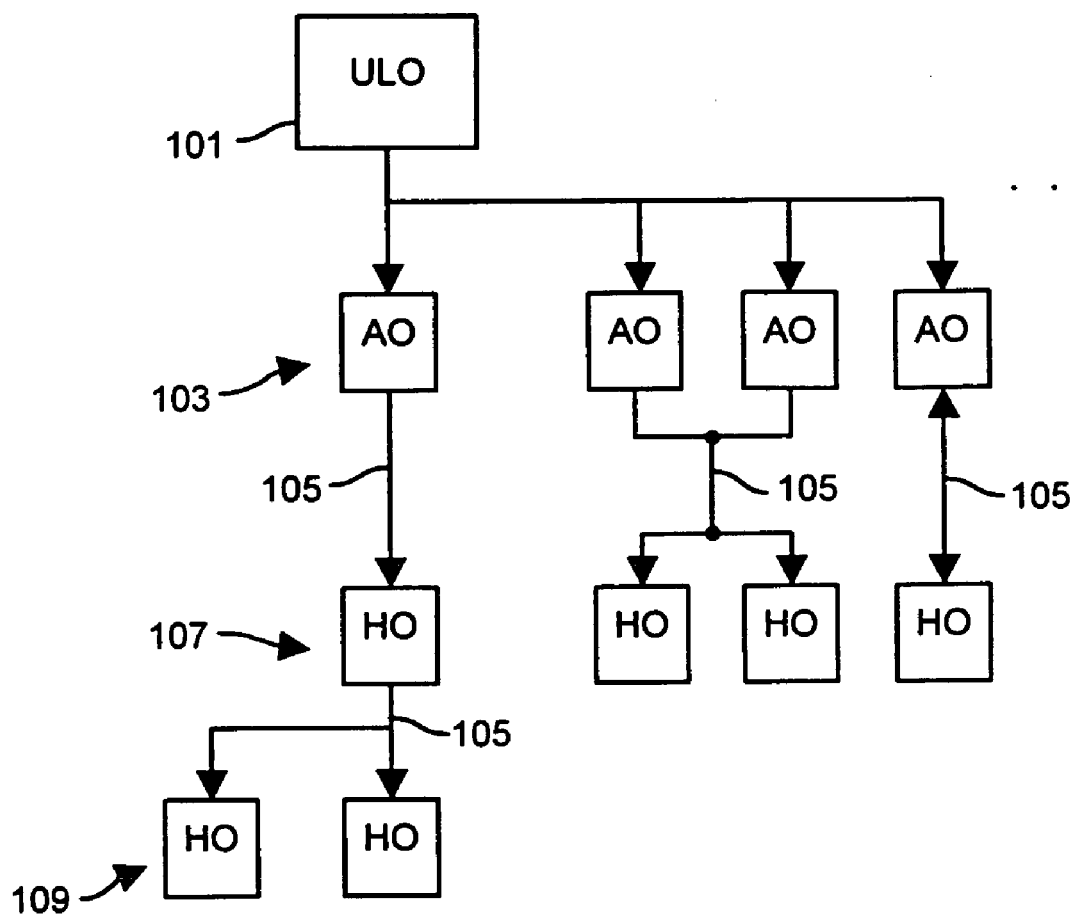
FIG. 3A is an exemplary block diagram representing the hierarchical relationships between an update list object, advertising objects, and hypertext transport protocol (HTTP) objects, which may be used to manipulate advertisement information within the satellite transmission and reception system of FIG. 1.

FIG. 3A is an exemplary block diagram representing the hierarchical relationships between a ULO, AOs, and HOs, which may be used to manipulate advertisement information within the transmission and reception system of FIG. 1. As shown in FIG. 3A, a ULO 101 lists AOs 103 which may, for example, be stored in the memory 70 of the IRD 36. The IRD 36 selects, from the ULO 101, one or more of the AOs 103 for local storage based on the start time data elements of the AOs 103, the current universal coordinated time (UTC) and/or the current local time at the IRD 36. Generally, the AOs 103 are stored in memory 70 before they are scheduled to begin display, based either on UTC or the local time, and are deleted from memory at the appropriate UTC time or latest local end time within the broadcast area of the advertisement.

Further, the AOs 103 may contain one or more links 105 to HOs 107. The links 105 are established using an "HTTP_object_id" data element which is discussed in more detail below. HOs contain HTML text, audio, or image objects and may contain any data that can be transferred using a conventional HTTP protocol. Additionally, the HOs 107 may be linked to other HOs 109 in conventional manners.

Figure 3B:
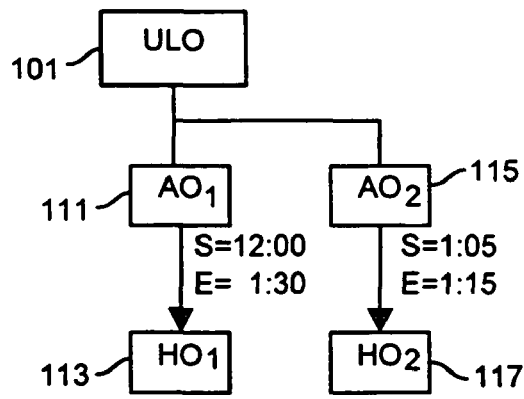
FIGS. 3B-3D illustrate one example of how advertising objects and associated HTTP objects may be added to or deleted from the memory of the IRD of FIGS. 1 and 2.
Figure 3C:
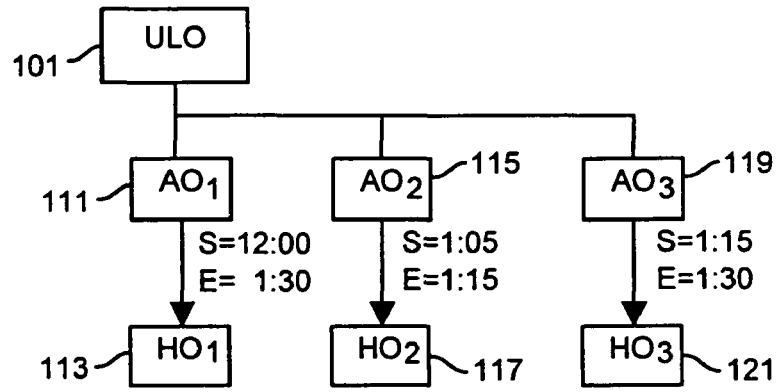
Figure 3D:
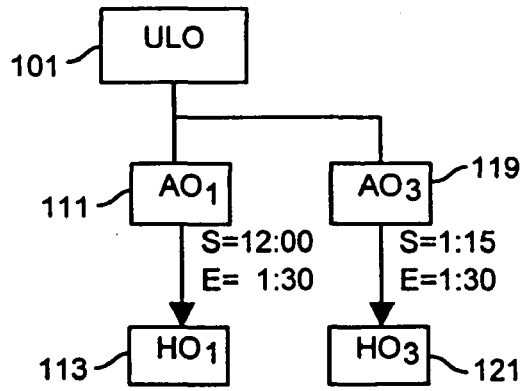

FIGS. 3B-3D, illustrate, by way of example only, how AOs and associated HOs may be added to and deleted from the memory 70 of the IRD 36. As shown in FIG. 3B, at a first time (e.g., 1:00 PM local time) the IRD 36 reads the ULO 101 and stores first and second AOs 111 and 115 in the memory 70. The first AO 111 has a local start time of 12:00 noon, a local end time of 1:30 PM, and is linked to a first HO 113. The second AO 115 has a local start time of 1:05 PM, a local end time of 1:15 PM, and is linked to a second HO 117. In FIG. 3C, the local time is now 1:10 PM and the IRD 36 has stored a third AO 119 in the memory 70. The third AO 119 has a local start time of 1:15 PM, a local end time of 1:30 PM, and is linked to a third HO 121. In FIG. 3D, the local time is now 1:15 PM and the IRD 36 has deleted the second AO 115 from the memory 70 because the end time of the second AO 115 is 1:15 PM. Thus, it can be appreciated that AOs 111 and 115 will be added to the memory 70 of the IRD 36 based on the start time data elements and will be deleted from the memory 70 based on the end time values, both of which are described in greater detail below.

The following discussion provides a more detailed description of the syntax and content for many of the data elements may be used with the AOs described herein. It should be understood, however, that this discussion does not in any way limit the data elements to those discussed below. In fact, it is contemplated that those of ordinary skill in the art may add to or modify the described elements without departing from the scope of the invention.

The data element "object_type" is represented by an 8-bit field 0x80, which indicates to the IRD 36 that the object is associated with an advertisement. The IRD 36 selectively processes objects having an "object_type" data element indicating that the associated object is an AO.

The data element "object_version" is an 8-bit field that represents the version level of the object. This field is incremented by 1 whenever the content of the object changes and the value wraps back to zero after reaching 255. This data element may be used by the IRD 36 to update an AO previously cached in the memory 70. The IRD 36 uses the value of the "object_version" data element to determine if a new version of a previously stored AO has been received and, if needed, the IRD 36 may update the version of the AO previously stored in the memory 70.

The data element "time_first_referenced" is a 32-bit field that represents the time that the AO is first scheduled for display. This time is specified as the number of GPS seconds since 12 A.M. Jan. 6, 1980. AOs linked by programs have a non-zero "time_first_referenced" value and AOs linked by a channel or that are not referenced by any other channel have a value of zero.

The "time_first_referenced" data element allows the IRD 36 to efficiently manage the memory 70 so that only those AOs scheduled to appear within a certain time period are stored in the memory 70. The "time_first_referenced" is the UTC equivalent of an advertisement start time or the earliest UTC time in the geographic broadcast location of an ad start day, hour and minute.

The data element "object_id" is a 32-bit field that uniquely identifies the AO.

The data element "HTTP_object_id" is a 32-bit field that represents the "object_id" for an HO that is linked to an AO. The HO contains the text and/or image information to be displayed in connection with the linked AO.

The data element "tuning_HTTP_indicator" is a 1-bit field that is used as a flag to indicate whether the AO contains a "tuning_general_URL" field (described below). This data element is set to 1 when the AO has a "tuning_general_URL" field and is set to zero when there is no "tuning_general_URL" field. When the data element is set to 1, the AO provides a link to tune to other content such as external IP address or internal channels.

The data element "UTC_display_control" is a 1-bit field. When set to 1, this field indicates that the AO contains an "ad_start_time" field and an "ad_stop_time" field (all times being referenced to UTC). When set to zero, this field indicates that the AO contains the fields "ad_start_year," "ad_start_month," "ad_start_day," "ad_start_hour," "ad_start_minute," "ad_stop_minute," "ad_stop_hour," "ad_stop_day," "ad_stop_month," and "ad_stop_year" (all these times being referenced to local time).

The data element "number_of_positions" is a 4-bit field that identifies the number of display positions allowed for the AO. The preferred position is listed first and is followed by alternative positions in descending order of preference. The value of this data element ranges from 1 to 15 and may be used to resolve conflicts when two or more ads are contending for the same display location at the same time.

The data element "display_position" is an 8-bit field that defines the physical display location for the AO. The value for this field ranges from zero to 255. As indicated above, each AO may specify multiple "display_position" values, but no "display_position" value may be specified more than once within a given AO. For non-HDTV display outputs, the display positions are based on ITU-R BT.601 for 4×3 aspect ratio 525 line systems, which includes 720 pixels in each of 480 lines of active video. For HDTV display outputs, the positions are based on SMPTE 274M, which includes 1920 pixels in each of 1080 lines of active video.

For a 16×9 aspect ratio (i.e., an HDTV aspect ratio), the IRD 36 may adjust all scaling factors so as not to distort the appearance of the advertisement images. The IRD 36 may further vary the actual display position ±5% from the "display_position," but does not modify the actual height and width of the "display_position" area. The IRD 36 supports all defined "display_positions" and skips all reserved "display_position" values so that if all "display_positions" for an AO are considered reserved for a particular IRD, the AO is not displayed.

Figure 4:
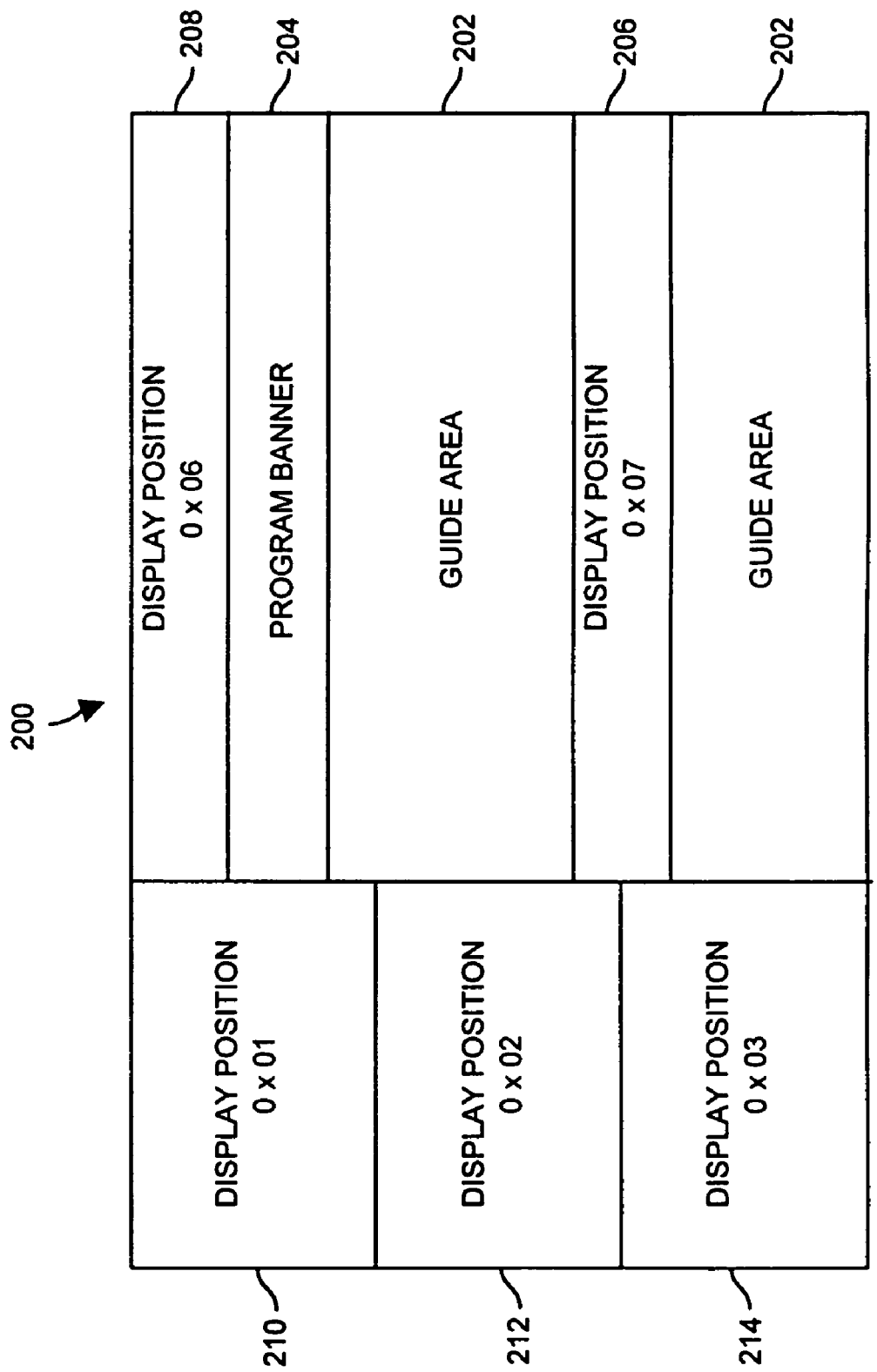
FIGS. 4-6 illustrate one possible arrangement of advertisement display positions within a program guide that may be produced by the IRD of FIGS. 1 and 2.
Figure 5:
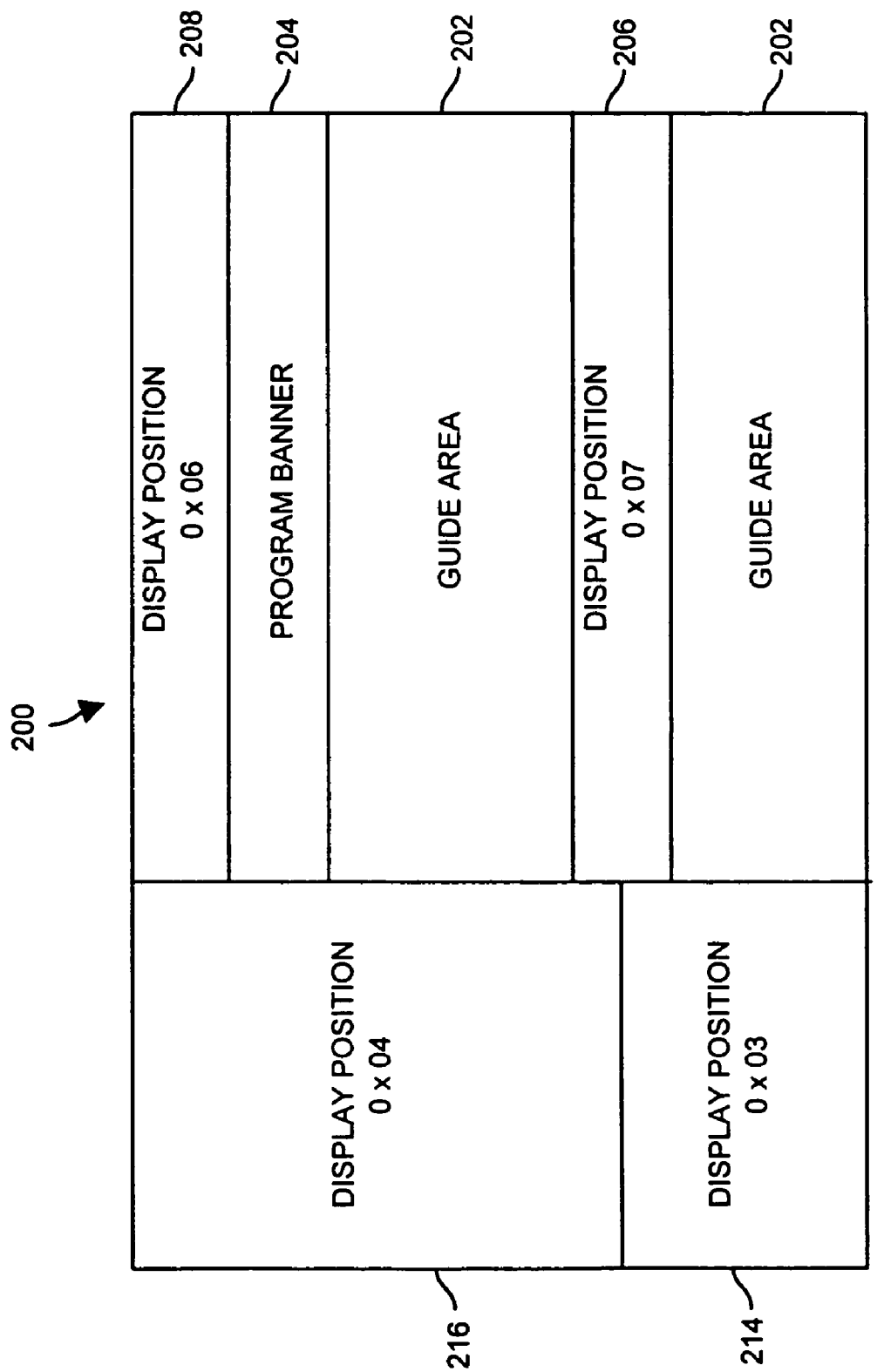
Figure 6:
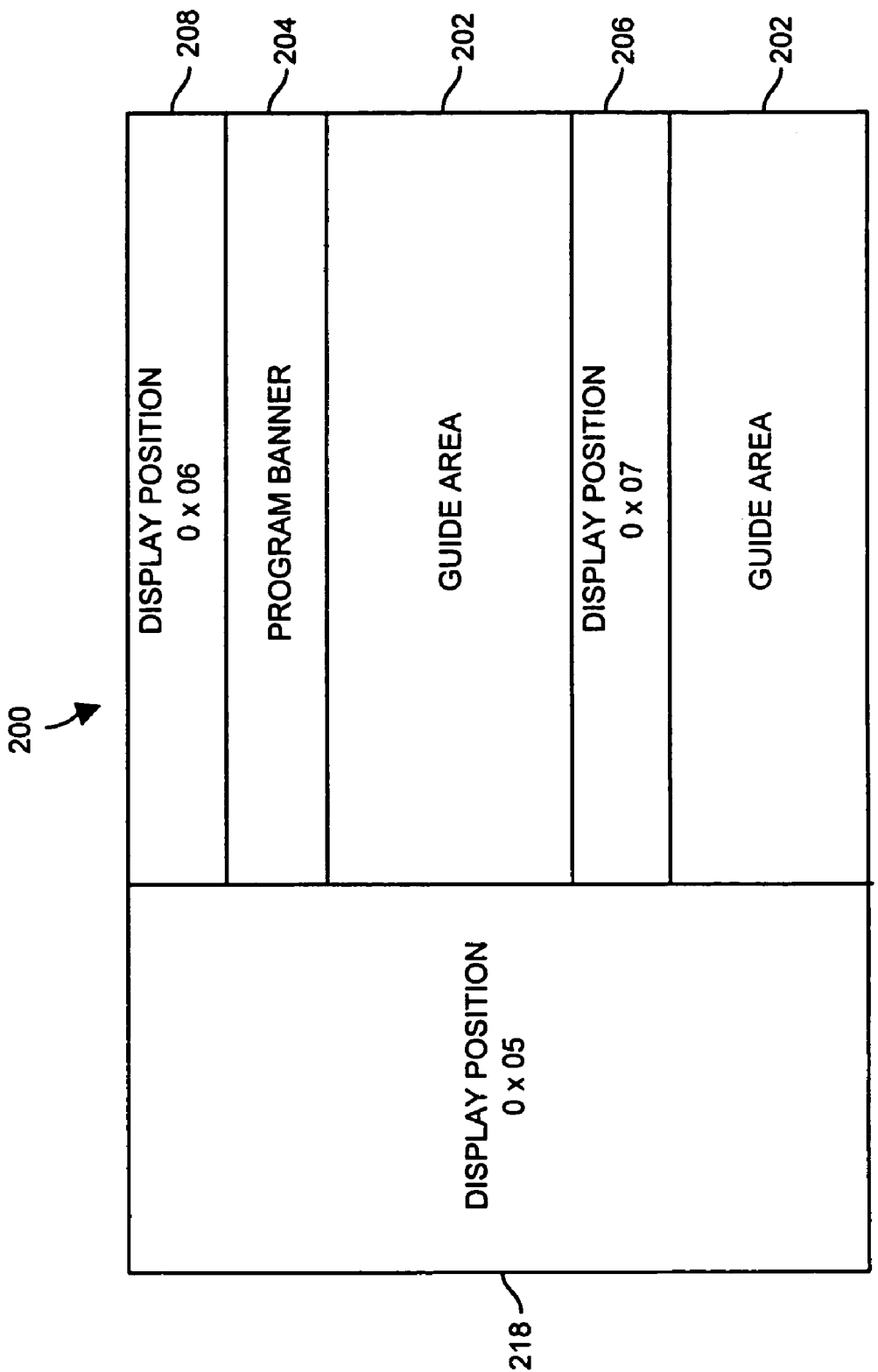

In some applications, predefined areas of the program guide display are designated for displaying advertisement images. These predefined display areas may be assigned to "display_position" values as shown in FIGS. 4-6. These figures are discussed in greater detail below and are intended to illustrate, by way of example only, one possible arrangement of display areas for advertisements. Those of ordinary skill in the art, however, will recognize that the techniques described herein may be implemented using a variety of different display area arrangements.

The data element "display_priority" is a 16-bit field that sets the relative display priority for the AO. The value for this field may range from zero to 65,535. Preferably, lower numeric values correspond to higher priorities (i.e., zero indicates the highest priority). In operation, this data element may be used to facilitate decisions made by the IRD 36 regarding which received AOs should be cached in the memory 70 of the IRD 36 and may be used to resolve conflicts between AOs that specify conflicting start times and display locations.

The data element "ad_start_time" is 32-bit field that identifies the schedule start time as the number of GPS seconds since 12 A.M. Jan. 6, 1980. When present, this field specifies the UTC at which the advertisement is eligible for display in the program guide.

The data element "ad_stop_time" is a 32-bit field that identifies the schedule stop time as the number of GPS seconds since 12 A.M. Jan. 6, 1980. When present, this field specifies the UTC at which the advertisement is no longer eligible for display in the program guide.

The following ten data elements are sent to the IRD 36 as local times and the IRD 36 converts these local time data elements into UTCs for scheduling purposes. Thus, an ad currently scheduled to appear in New York may begin display in California three hours later.

The data element "ad_start_year" is an 8-bit field that indicates the year, in the local time zone of the IRD 36, in which to begin displaying the advertisement. The value for this field ranges from zero to 255 and is added to 1980 to determine the starting year. For example, if "ad_start_year" equals 19 the advertisement is scheduled to begin display in 1999.

The data element "ad_start_month" is a 4-bit field representing the month, in the local time zone of the IRD 36, in which the advertisement is to begin display. This field ranges in value from 1 to 12, representing the months January to December, respectively.

The data element "ad_start_day" is a 5-bit field that indicates the day, in the local time zone of the IRD 36, in which the advertisement may be first displayed. The value for this field ranges from 1 to 31.

The data element "ad_start_hour" is a 5-bit field that indicates the hour, in the local time zone of the IRD 36, in which the advertisement may be first displayed. The value for this field ranges from zero to 23.

The data element "ad_start_minute" is a 6-bit field that indicates the minute, in the local time zone of the IRD, in which the advertisement is to be displayed. The value for this field ranges from zero to 59.

The data element "ad_stop_minute" is a 6-bit field that indicates the minute, in the local time zone of the IRD 36, in which the advertisement is to stop displaying. The value for this field ranges from zero to 59.

The data element "ad_stop_hour" is a 5-bit field that indicates the hour, in the local time zone of the IRD 36, in which the advertisement is to stop displaying. The value for this field ranges from zero to 23.

The data element "ad_stop_month" is a 4-bit field that indicates the month, in the local time zone of the IRD 36, in which the advertisement is to stop displaying. The value for this field ranges from zero to 23.

The data element "ad_stop_day" is a 5-bit field that indicates the day, in the local time zone of the IRD 36, in which the advertisement is to stop displaying. The value for this field ranges from 1 to 31.

The data element "ad_stop_year" is an 8-bit field that indicates the year, in the local time zone of the IRD 36, in which the advertisement is to stop displaying. The value for this field ranges from zero to 255. This value is added to 1980 to determine the ending year. For example, 18 indicates the year 1998.

The data element "ad_duration" is a 16-bit field that represents the duration in seconds that the advertisement will be displayed in the program guide for each showing. Additionally, an advertisement may be shown multiple times during a single program guide session. For example, the program guide may be displayed for a long enough time to permit the advertisement to be shown more than once. The value for this field ranges from zero to 65,535.

The data element "tuning_general_URL_length" is a 12-bit field that gives the total length in bytes of the "tuning_general_URL" string. The value for this field ranges from 1 to 4079.

The data element "tuning_general_URL" string contains the bytes for the URL. When the URL exits and the advertisement is selected, the URL is managed as an HTTP link. Using conventional, well-known techniques, the HTTP link may provide a link to an external address such as an IP address or to an internal address such as a channel.

The data element "descriptors_loop_length" is a 16-bit field that gives the total length in bytes of the various "descriptor" data elements that are described below. The value for this field ranges from zero to 65,535.

The data element "about_descriptor" provides an advertisement description. When there is no "about_descriptor," the description shall default to "No Information Available."

The data element "category_descriptor" provides the category classification for the advertisement. When there is no "category_descriptor," the advertisement defaults to the no category classification. This data element allows various sorting and prioritization systems and methods to be used with the invention.

The data element "name_descriptor" provides associations between name texts and their corresponding entries in a naming system. When there is no "name_descriptor," "name_long_descriptor," or "name_relational_descriptor," the IRD 36 makes no association to a naming system. A more detailed discussion of a naming system that may be used with the invention may be found in a co-pending commonly owned application entitled "Electronic Television Program Guide Data Naming System and Method," bearing Ser. No. 60/126,775, and filed on Mar. 29, 1999, the entire disclosure of which is incorporated herein by reference.

The data element "name_long_descriptor" provides associations between name texts and their corresponding entries in the naming system. When there is no "name_descriptor," "name_long_descriptor," or "name_relational_descriptor," the IRD 36 makes no association to the naming system.

The data element "name_relational_descriptor" provides one or more sets of related name texts within a naming system. When there is no "name_descriptor," "name_long_descriptor," or "name_relational_descriptor," the IRD 36 makes no association to the naming system.

As discussed above, the AOs may provide links to HOs and the HOs may include image and textual data that is to be displayed in connection with the AOs. The hierarchical arrangement of AOs and HOs provides a flexible system and method of transmitting, receiving and displaying advertisements because image data does not have to be embedded within each AO. Namely, image information may be provided to AOs by establishing the appropriate links to the desired HOs. In this manner, one HO may be associated with one or more AOs and one AO may be linked to one or more HOs as needed.

The following discussion provides one exemplary representation of syntax describing HOs. It should be understood, however, that this discussion does not in any way limit the data elements to those discussed below. In fact, it is contemplated that those of ordinary skill in the art may add or modify the described elements without departing from the scope of the invention.

The data element "object_type" is represented by an 8-bit field 0x88, which indicates to the IRD 36 that the object is associated with an HO. The IRD 36 selectively processes objects having an "object_type" data element indicating that the associated object is an HO.

The data element "object_version" is an 8-bit field that represents the version level of the object. This field is incremented by 1 whenever the content of the object changes. The value wraps back to zero after reaching 255. This data element may be used by the IRD 36 to update an HO previously cached in the memory 70 of the IRD 36. The IRD 36 uses the value of the "object_version" data element to determine if a new version of a previously stored HO has been received. The IRD 36 may accordingly update the version of the HO previously stored in the memory 70 of the IRD 36.

The data element "time_first_referenced" is a 32-bit field that represents the time that the HO is first available for display. This time is specified as the number of GPS seconds since 12 A.M. Jan. 6, 1980. HOs linked by programs have a non-zero "time_first_referenced" value and HOs linked by a channel or that are not referenced by any other channel have a value of zero.

The "time_first_referenced" data element allows the IRD 36 to efficiently manage the memory 70 such that only those HOs available for display within a certain time period are stored in the memory 70.

The data element "object_id" is a 32-bit field that uniquely identifies the HO. AOs may link to an HO by including the value of this data element in the "HTTP_object_id" data element of the AO.

The data element "priority" is a 16-bit field that defines the storage priority for the HO. The value for this field ranges from zero to 65,535. Lower values correspond to higher priorities. If the IRD 36 does not have sufficient memory to store an HO that is needed for display (i.e., one referenced/linked by a currently stored AO scheduled for display), and if the IRD 36 is storing HOs with a lower priority, then the IRD 36 will discard the lowest priority HOs until either (1) sufficient memory space has been cleared to allow storage of the HO, or (2) all HOs with lower priorities than the current HO have been discarded. A more detailed discussion of a caching method that may be used to manage the storage of HOs in the memory 70 of the IRD 36 may be found below in connection with discussion of FIGS. 7 and 8.

The data element "cache_type" is a 16-bit field that distinguishes the type of object that is referencing the current HO. The cache type for HOs linked to an AO equals 0x00. The IRD 36 uses this data element to determine how and where the referenced HO should be cached. For example, HOs having the cache type equal to 0x00 will be stored in a cache associated with AOs.

The data element "content_type" are data bytes for the multi-purpose Internet mail extensions (MIME) type string that specifies the content type of the HO. The type string contains a standard "category/type" format. The following types are defined and required: (1) text/apg-html, which is text in APG HTML subset, and (2) ctxt/apg-html, which is compressed text in APG HTML subset. Other content types (i.e., MIME types) are identical to those used in connection with the World Wide Web. Additional information on these types can be found in: (1) ftp://ftp.isi.edu/in-notes/iana/assignments/media-types/; (2) RFC 2048, MIME Part Four, registration procedures; and RFC 1521, MIMI Part One, Mechanisms for Specifying and Describing the Format of Internet Message Bodies.

The data element "support_level" is a 16-bit field that works in conjunction with the "content_type" field. The value for this data element ranges from zero to 65,535. In operation, the IRD 36 first examines the "content_type" data element to determine if the HO type is supported. If the HO type is supported, the IRD 36 examines the "support_level" data element. If the value of the "support_level" data element exceeds a predetermined support level, the HO is discarded from the IRD 36. If the HO is supported, then it may be stored in the memory 70 in connection with one or more stored AOs. If the IRD 36 encounters a received HO with the same "object_id" as a currently cached HO, the IRD 36 will replace the currently cached HO with the received HO if it is supported by the IRD 36 and has a higher "support_level" value. For example, if an IRD 36 is capable of supporting animated GIF type HOs then these will be favored for storage in memory 70 over non-animated GIF type HOs having the same "object_id." Table 1 below summarizes the "support_level" associated with the available HO types.

TABLE 1

| "content_type" | "support_level" |
| --- | --- |
| text/apg-html | 0x100 |
| ctxt/apg-html | 0x100 |
| image/gif | 0x100 for GIF, 0x200 for animated GIF |
| any other | 0x100 |

The data element "content_type_length" is an 8-bit field that gives the total length in bytes of the "content_type" string. The value of the this data element ranges from 1 to 255.

The data element "HTTP_header_length" is a 16-bit field that specifies the length of the "HTTP_header" field. The value for this data element ranges from zero to 65,535.

The data element "HTTP_header" contains the header information for the HO that would otherwise be carried by the HTTP protocol. However, the "content_type" field is never present because that information is carried in the "content_type" field of the object. The contents of the field are ASCII strings with CR/LF characters marking the ends of lines.

The data element "HTTP_data_length" is a 32-bit field that gives the total length in bytes of the "HTTP_data." The value for this field ranges from 1 to 1,026,029.

The data element "HTTP_data" contains the HO image data for display in connection with a linking AO.

The data element "descriptors_loop_length" is a 16-bit field that provides the total length in bytes of the descriptors described below. The value for this data element ranges from zero to 65,535.

The data element "future_defined_descriptor" is a descriptor reserved for future definition. The IRD 36 only processes currently defined descriptors and, accordingly, discards undefined/unknown descriptors.

The data element "content_advisory_descriptor" provides the rating classification for the contents of the HO being processed. When there is no "content_advisory_descriptor," the HO defaults to no rating.

The data element "name_descriptor" provides associations between name texts and their corresponding entries in a naming system. When there is no "name_descriptor," "name_long_descriptor," or "name_relational_descriptor," the IRD 36 makes no association to a naming system.

The data element "name_long_descriptor" provides associations between name texts and their corresponding entries in the naming system. When there is no "name_descriptor," "name_long_descriptor," or "name_relational_descriptor," the IRD 36 makes no association to the naming system.

The data element "name_relational_descriptor" provides one or more sets of related name texts within a naming system. When there is no "name_descriptor," "name_long_descriptor," or "name_relational_descriptor," the IRD 36 makes no association to the naming system.

Thus, the data structures of the ULO, AOs and HOs, which includes the data elements described above, provides a highly flexible framework for the processing and display of advertisements. Namely, the IRD 36 may use one or more of the data element values to locally process, schedule, and display the advertisement image data in accordance with local conditions at the IRD 36. It should be recognized that a variety of conventional, known software techniques could be employed by one of ordinary skill in the art to implement the ULO, AOs, and HOs using the above-described data structures. Furthermore, it is envisioned that one of ordinary skill in the art could create additional data elements, without departing from the scope of the invention, to accomplish any desired local processing of the AOs and HOs.

FIGS. 4-6 illustrate one possible multi-segment program guide display template 200 that may be used to display advertisements. The program guide display template 200 includes grid guide areas 202, a program banner 204, a channel row display position 206, a header display position 208, and left-justified upper, middle, and lower display positions 210, 212 and 214. A first overlay display area 216 (FIG. 5) overlays the upper and middle display areas 210 and 212, and a second overlay display area 218 (FIG. 6) overlays the upper, middle, and lower display areas 210, 212 and 214.

The grid guide areas 202 are conventionally formatted so that program times appear in columns across the guide areas 202, channels are associated with rows, and individual programs are represented within one or more cells of the guide areas 202. The channel row display position 206 may be associated with a particular channel that is currently displayed in an adjacent row of the guide areas 202.

In operation, the channel row display position 206 may float (i.e., move up or down within the guide areas 202) with its associated channel as the user scrolls through the guide areas 202. If the user scrolls far enough so that the channel currently associated with the channel row display position 206 is no longer viewable, then the channel row display position 206 may be associated with another channel so that a related AO, currently scheduled for display in the channel row display position 206, may be displayed. Alternatively, if the user scrolls through the guide areas 202 and a channel having a higher priority AO associated with it becomes viewable, then the channel row display position 206 may be reassigned to display the advertisement with that channel. Additionally, more than one channel row display position 206 may be provided so that two or more floating channel row advertisements can be displayed simultaneously.

The upper, middle, and lower display positions 210, 212 and 214 are fixed locations (i.e., they do not float) within the program guide template 200. The overlay display positions 216 and 218 overlay the upper, middle, and lower positions 210, 212 and 214 and are used to display larger advertisement images. Use of the overlay positions 216 and 218 must be coordinated with the use of the upper, middle, and lower positions 210, 212 and 214 so that the relative priorities assigned to the respective advertisements is observed and so that the size of their respective advertisement images is compatible with the display position to which they are assigned.

Each of the display positions 204-218 are assigned a "display_position" value. For example, the channel row display position may be assigned a "display_position" value of 0x07. Thus, when the IRD 36 processes an AO having a "display_position" data element value of 0x07, the IRD 36 appropriately displays the image information associated with this AO as a floating channel row when the associated channel is viewable in the guide areas 202.

The IRD 36 locally caches some of the received AOs (along with linked HOs) and may discard some of the received AOs and HOs and/or some of the already cached AOs and HOs. Because the memory 70 is limited, the IRD 36 manages the memory 70 so that only compatible non-expired advertisements with the highest priorities are locally cached in the memory 70. Additionally, the IRD 36 manages the cache of AOs and HOs so that only the newest and most sophisticated versions of the AOs and HOs (which are also compatible with the IRD 36) are stored in the memory 70. In some applications, the IRD 36 may selectively cache and discard received AOs based on the preferences/characteristics of the user.

Figure 7:
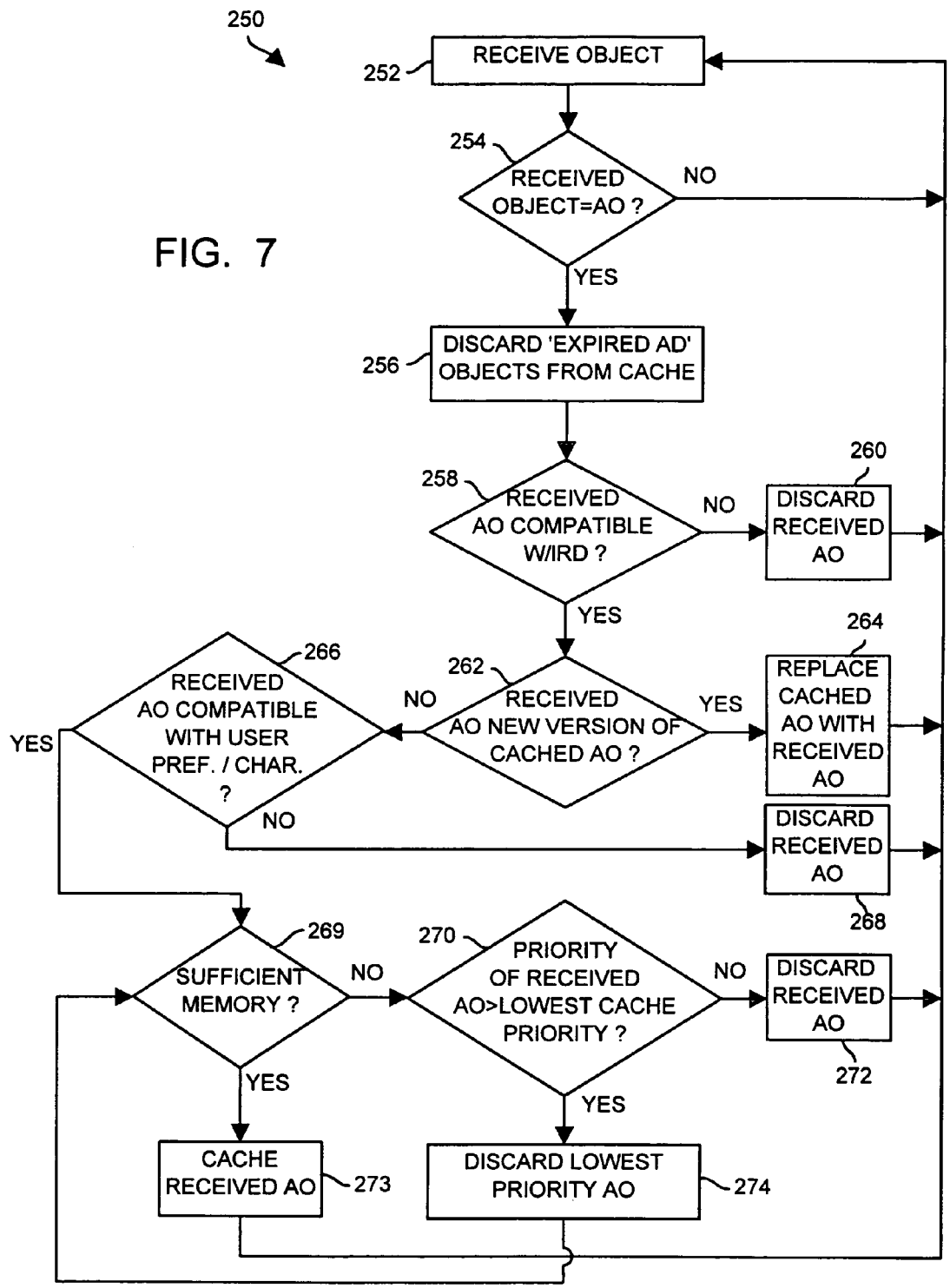
FIG. 7 is an exemplary flow diagram illustrating one method of processing advertising objects within the IRD of FIGS. 1 and 2.

FIG. 7 is an exemplary flow diagram illustrating one method 250 of processing AOs that within the IRD 36 of FIGS. 1 and 2. The method 250 may be implemented using known software programming techniques and is executed using the microprocessor 58. In step 252, the IRD 36 receives an object that has been demultiplexed and decoded from the broadcast data and in step 254 the processor 58 checks the value of the field assigned to the "object_type" data element to determine if the received object is an AO. If the received object is not an AO, the processor 58 enters step 252. On the other hand, if the received object is an AO, the processor 58 enters step 256 and collects and discards expired AOs from the local cache in the memory 70. The IRD 36 identifies expired AOs by referring to the ULO. The ULO contains only unexpired AOs. Thus, the IRD 36 will only cache AOs that are currently contained in the ULO and will discard currently cached AOs that are not currently in the ULO (i.e., those that are expired). In step 258, the processor 58 checks the received AO to determine if it is compatible with the sophistication of the IRD 36. The processor 58 may check one or more the data elements associated with the received AO to make an assessment of local compatibility with the IRD 36. For example, the processor 58 may look at the data elements "object_id" and/or "object_version" to make this decision. If the received AO is not compatible with the IRD 36, the processor 58 discards the received AO in step 260 and returns to step 252. If the received AO is compatible, the processor 58 enters step 262 and determines if the received AO is a new version of an already cached AO. If the received AO is a new version of an already cached AO, the processor 58, in step 264, replaces the already cached AO with the received AO (thereby caching the received AO) and then returns to step 252. If the received AO is not a new version of a currently cached AO, the processor 58 enters step 266 and determines if the received AO is compatible with the user preferences/characteristics associated with the IRD 36. This may be accomplished by using the various "descriptor" data elements to select AOs that are compatible. For example, a user may have a preference for sports related advertisements. Accordingly, the processor 58 may select AOs having one or more "category_descriptor" data elements that are consistent with this preference. If the processor 58 determines that the AO is not compatible with the local preferences/characteristics, then the received AO is discarded in step 268 and the processor 58 returns to step 252. If the processor 58 determines that the received AO is compatible with the user preferences/characteristics then the processor 58 enters step 269 and determines if there is sufficient space in memory 70 to cache the AO currently being processed. If the available memory is insufficient, then processor 58 enters step 270 and determines if the priority of the received AO is greater than the lowest priority amongst the currently cached AOs. The processor 58 uses the value stored in the field representing the data element "display_priority" to make this decision. If the priority of the received AO is not greater than the lowest, currently cached AO priority, the IRD 36 discards the received AO and the processor 58 reenters step 252. If the priority of the received AO is greater than the lowest, currently cached AO, the processor 58 discards the lowest priority, currently cached AO priority and then reenters step 269. In step 269, if there is sufficient memory, the processor 58 caches the received AO and reenters step 252.

Figure 8:
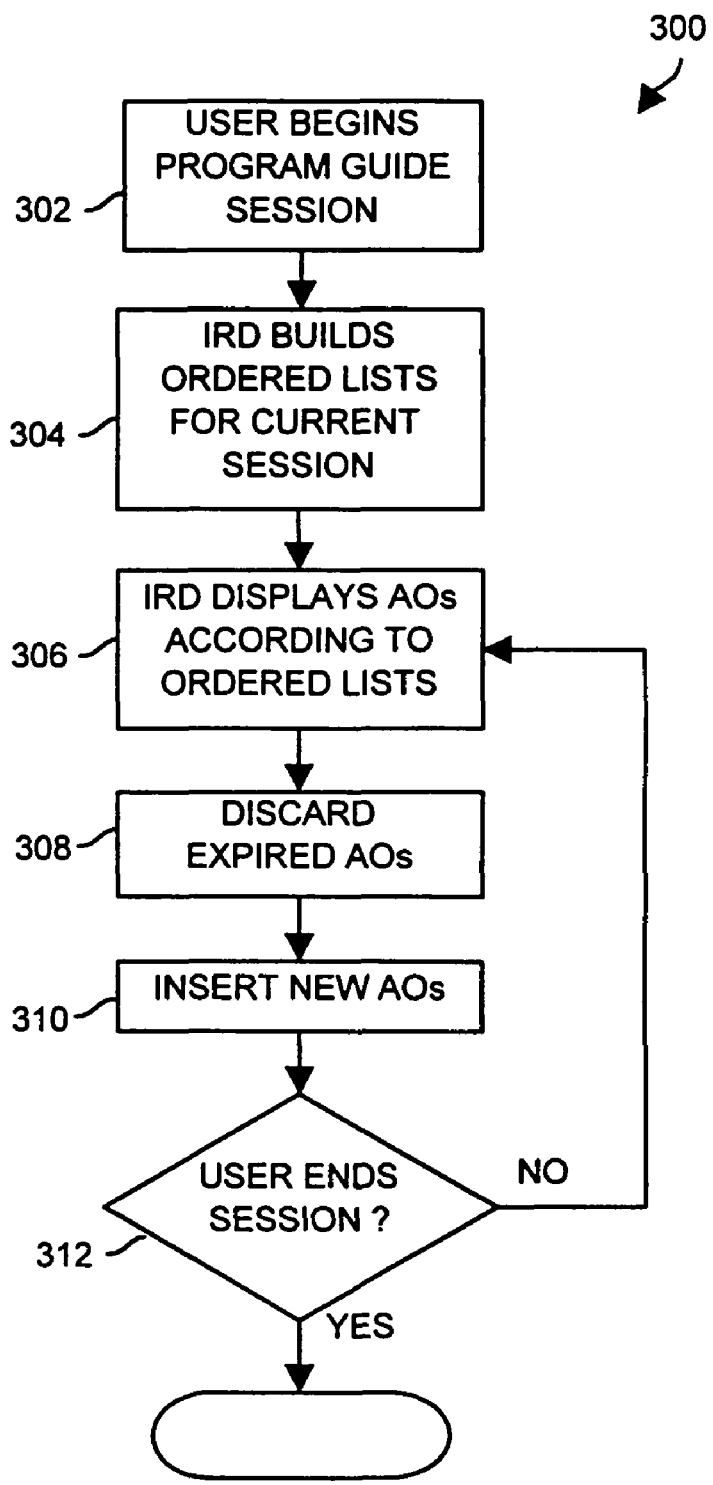
FIG. 8 is an exemplary flow diagram illustrating one method of scheduling and displaying advertising objects within the system of FIG. 1.

FIG. 8 is an exemplary flow diagram illustrating one method 300 of scheduling and displaying advertising objects within the system of FIG. 1. As with the method of FIG. 7 described above, the method 300 shown in FIG. 8 is preferably executed by processor 58. In step 302 a user invokes the program guide display to begin a program guide session and in step 304 the processor 58 builds an ordered list for each of the available advertisement display positions using the currently cached AOs. Generally speaking, the ordered lists provide a prioritized sequence of AOs that are cyclically displayed in the display positions which correspond to the lists. The AOs are initially sorted into the appropriate ordered lists according to the value of their "display_position" data elements. The AOs in each list are then arranged in descending order of priority according to the value of the "display_priority" data elements.

When the processor 58 builds the ordered lists, conflicts between AOs may arise as a result of two consecutive AOs in a given ordered list having the same value for "display_priority." If one or both of the conflicting AOs has a "number_of_positions" data element greater than 1, the processor 58 attempts to move one of the conflicting AOs to an alternative "display_position" (i.e., ordered list) that provides the AO with the same or a higher display rank. Thus, the processor 58 will attempt to provide the AOs with the highest possible ordered list rank (i.e., the earliest display time) within the set of allowable "display_positions" that each AO specifies.

Conflicts may also arise between the overlay display positions 216 and 218 and the upper, middle, and lower display positions 210, 212 and 214. One method of resolving these conflicts is to compare the "display_priority" of the overlay position to an effective priority of the underlying display positions. For example, the weighted and/or unweighted average of the underlying position priorities may be compared to the priority of the overlay positions. However, many methods of resolving conflicts between the overlay display positions 216 and 218 and the upper, middle, and lower display positions 210, 212 and 214 may be employed without departing from the scope of the invention. It is preferable, however, that the resolution method reasonably meets the relative display priorities for conflicting AOs.

To provide a seamless appearance to the cycling of the overlay display positions 216 and 218, AOs currently displaying in the respective underlying upper, middle, and/or lower display positions 210, 212 and 214 are extinguished simultaneously. For example, if advertisements scheduled for display in the upper, middle, and lower positions 210, 212 and 214 specify different "ad_duration" values, the actual display times for these advertisements may have to be extended somewhat so that they terminate simultaneously at the moment the overlaying advertisement is scheduled to appear.

In step 306, the processor 58 begins to access the ordered lists and display the advertisements and in step 308 the processor 58 discards any expired AOs from the ordered lists by comparing the currently cached AOs to the those contained in the ULO. Only AOs in the ULO may be currently cached in the memory 70 and those currently cached AOs which are not currently in the ULO are discarded by the IRD 36. In step 310, the processor inserts any newly cached AOs into the ordered lists and in step 312 the processor 58 checks if the user has ended the program guide session. If the user has ended the session, the method 300 terminates. If the user has not ended the session, the processor 58 returns to step 306.

Thus, with the above described methods (shown in FIGS. 7 and 8), as the user views the program guide, locally cached advertisements are cyclically displayed according to ordered lists. The ordered lists are constructed using one or more of the data elements associated with each of the cached AOs and each ordered list corresponds to a particular display location within the program guide. AOs are organized/ranked within the lists so that AOs having a higher priority are displayed first. As a particular AO finishes displaying in a location, the next highest ranked AO is selected from the appropriate ordered list and is displayed in the program guide.

Thus, the techniques described herein provide a flexible system and method of transmitting, receiving and displaying advertisements. Namely, advertisements are transmitted and received as digital data objects (i.e., AOs and associated HOs) and these data objects each contain a plurality of data elements that characterize the object. The individual users' receiving stations process the received objects in accordance with information contained in the data elements. In this way, individual IRDs may locally optimize the local storage, scheduling, and display the received objects in the program guide.

Although the above detailed description focuses on the distribution and scheduling of video advertisements via the program guide of a satellite broadcast system, persons of ordinary skill in the art will appreciate that the techniques described herein are in no way limited to satellite broadcasts or program guides. To the contrary, any system which might benefit from the locally optimized advertisement scheduling may employ the techniques described herein.

Of course, it should also be understood that a range of changes and modifications can be made to the preferred embodiment described above. It is therefore intended that the foregoing detailed description be regarded as illustrative rather than limiting and that it be understood that it is the following claims, including all equivalents, which are intended to define the scope of this invention.

What is claimed is:

1. A system to display digital advertisement information, the system comprising:
   a receiver for use at a subscriber site;
   a processor in the receiver;
   a memory communicatively coupled to the processor in the receiver; and
   software stored on the memory that, when executed by the processor, causes the processor to:
      receive an advertisement object and at least one link associated with the advertisement object, wherein the at least one link associates the advertisement object with a plurality of image objects corresponding to the advertisement object, and wherein each of the image objects requires a different processing capability to be rendered by the receiver;
      use the link to select one of the plurality of image objects and discard the remaining plurality of image objects based on a processing capability of the receiver, wherein the plurality of image objects are transmitted to the receiver and the one of the plurality of image objects is selected from the transmitted plurality of image objects, and wherein the selected one of the plurality of image objects is capable of being rendered by the receiver; and display the advertisement object and the selected one of the plurality of image objects.

2. The system of claim 1, wherein the software is further adapted to be executed by the processor to select the advertisement object based on a user's preference.

3. The system of claim 1, wherein the image objects are linked to at least a second advertisement object.

4. The system of claim 1, wherein the memory stores a local condition indicative of the processing capability of the receiver.

5. The system of claim 1, wherein the software is further adapted to be executed by the processor to select a second advertisement object based on a location of the receiver.

6. The system of claim 1, wherein the software is further adapted to be executed by the processor to display the advertisement object based on an ordered list.

7. A method of displaying advertisements, the method comprising:

receiving an advertisement object and at least one link associated with the advertisement object, wherein the at least one link associates the advertisement object with a plurality of image objects corresponding to the advertisement object, and wherein each of the image objects requires a different processing capability to be rendered by a receiver;

using the link to select, via a processor, one of the plurality of image objects and discard the remaining plurality of image objects based on the processing capability of the receiver, wherein the plurality of image objects are transmitted to the receiver and the one of the plurality of image objects is selected via the receiver from the transmitted plurality of image objects, and wherein the selected one of the plurality of image objects is capable of being rendered by the receiver; and displaying the advertisement object and the selected one of the plurality of image objects.

8. The method of claim 7, further comprising determining if the received advertisement object is a new version of a previously cached advertisement object and replacing the previously cached advertisement object with the received advertisement object if the received advertisement object is the new version of the previously cached advertisement object.

9. The method of claim 8, wherein determining if the received advertisement object is the new version of the previously cached advertisement object includes comparing data elements associated with an advertisement object version.

10. The method of claim 7, further comprising comparing a priority of the received advertisement object to a lowest priority associated with a plurality of cached advertisement objects and discarding the received advertisement object if the priority of the received advertisement object is less than or equal to the lowest priority associated with the plurality of cached advertisement objects.

11. The method of claim 10, wherein comparing the priority of the received advertisement object to the lowest priority associated with the plurality of cached advertisement objects includes comparing data elements associated with display priority.

12. The method of claim 7, further comprising replacing one from a plurality of cached advertisement objects having a lowest priority with the received advertisement object if the priority of the received advertisement object is greater than the lowest priority of the one from the plurality of the cached advertisement objects.

13. The method of claim 7, further comprising discarding expired advertisement objects from a cache memory of the receiver.

14. The method of claim 13, wherein discarding the expired advertisement objects from the cache memory includes comparing a data element associated with advertisement object expiration to a local time at the receiver.

15. The method of claim 7, further comprising selecting the one of the plurality of image objects based on a local condition stored in the receiver indicative of the processing capability of the receiver.

16. The method of claim 7, further comprising determining if the received advertisement object is compatible with a user's preference and discarding the received advertisement object if it is not compatible with the user's preference.

17. The method of claim 16, wherein determining if the received advertisement object is compatible with the user's preference includes comparing a data element of the advertisement object associated with a descriptor of the user's preference.

18. A system for generating digital advertisements, the system comprising:

a processor;

a computer readable medium coupled to the processor; and
software stored on the computer readable medium that, when executed by the processor, causes the processor to:

generate an advertisement object;

generate at least one link associated with the advertisement object, wherein the at least one link associates the advertisement object with a plurality of image objects corresponding to the advertisement object, and wherein each of the image objects requires a different processing capability to be rendered by a receiver; and transmit the advertisement object, the plurality of image objects, and the at least one link via a transmission data stream to the receiver, wherein the receiver is to select one of the plurality of image objects and discard the remaining plurality of image objects based on a processing capability of the receiver, and wherein the selected one of the plurality of image objects is capable of being rendered by the receiver.

19. The system of claim 18, wherein the receiver is configured to store therein a respective local condition indicative of the processing capability of the receiver.

20. The system of claim 18, wherein the software is further adapted to transmit along with the advertisement object and the at least one network link a data element indicative of at least one of a user preference, a geographic location, a user interface sophistication level, a location within a display unit, a display priority, or a display time.

21. The system of claim 18, wherein each of the image objects includes one of video information, graphical information or textual information.

22. The system of claim 18, wherein each of the image objects includes data associated with one of a version of the image information, a priority, a sophistication level or an image format.

23. The system of claim 18, wherein the image objects are based on a transport protocol.

24. The system of claim 18, wherein a first one of the image objects is a non-animated graphic requiring the receiver to have a processing capability to render the non-animated graphic, and wherein a second one of the image objects is an animated graphic requiring the receiver to have a processing capability to render the animated graphic.

25. A receiver comprising:
an interface configured to communicatively couple the receiver to a television at a subscriber site;
a processor to receive an advertisement object and at least one link associated with the advertisement object, wherein the at least one link associates the advertisement object with a plurality of image objects corresponding to the advertisement object, and wherein each of the image objects requires a different processing capability to be rendered by the receiver;
a communication interface to select one of the plurality of image objects using the link and discard the remaining plurality of image objects based on a processing capability of the receiver, and wherein the selected one of the plurality of image objects is capable of being rendered by the receiver; and
a display interface to display the advertisement object and the selected one of the plurality of image objects.

26. The receiver of claim 25, wherein the processor is further configured to select the advertisement object based on at least one of a user's preference or a geographic location of the receiver.

27. The receiver of claim 25, further comprising a memory configured to store a local condition indicative of the processing capability of the receiver wherein the processor is further configured to select the advertisement object based on the local condition and discard other advertisement objects based on the local condition.

28. The receiver of claim 25, further comprising a tuner to receive television programming from a broadcast transmission station.

29. The receiver of claim 25, further comprising a display interface configured to display a program guide and overlay the advertisement object and the retrieved image object onto the program guide.

30. The receiver of claim 25, wherein the processor is further configured to receive an update list and manage the advertisement object and other cached advertisement objects previously stored in the receiver based on the update list.

31. The receiver of claim 30, wherein the processor is further configured to manage the advertisement object by storing the advertisement object based on the update list.

32. The receiver of claim 30, wherein the processor is further configured to manage the cached advertisement objects by discarding at least some of the cached advertisement objects based on the update list.

33. A method of generating digital advertisements, comprising:
generating an advertisement object;
generating, via an encoding system, at least one link associated with the advertisement object, wherein the at least one link associates the advertisement object with a plurality of image objects corresponding to the advertisement object, and wherein each of the image objects requires a different processing capability to be rendered by a receiver; and
transmitting the advertisement object, the plurality of image objects, and the at least one link via a transmission data stream to the receiver, wherein the receiver is to select one of the plurality of image objects and discard the remaining plurality of image objects based on a processing capability of the receiver, and wherein the selected one of the plurality of image objects is capable of being rendered by the receiver.

34. The method of claim 33, further comprising replacing a cached advertisement object previously stored in the receiver with the advertisement object if the advertisement object is a new version of the cached advertisement object.

35. The method of claim 34, further comprising comparing via the receiver data associated with the advertisement object with data stored in the receiver to determine whether the advertisement object is the new version of the cached advertisement object.

36. The method of claim 33, further comprising if the received advertisement object is not compatible with the receiver based on a local condition stored in the receiver indicative of a processing capability of the receiver, discarding the advertisement object via the receiver.

37. The method of claim 33, further comprising comparing via the receiver a priority level of the advertisement object to a second priority level and discarding the advertisement object via the receiver if the priority level of the advertisement object is less than or equal to the second priority level.

38. The method of claim 33, further comprising comparing via the receiver a priority level of the advertisement object to a second priority level and replacing a cached advertisement object previously stored in the receiver with the advertisement object if the priority level of the advertisement object is greater than the second priority level.

39. The method of claim 33, further comprising discarding other advertisement objects via the receiver based on at least one of a user's preference or a geographic location of the receiver.

40. The method of claim 33, further comprising displaying a program guide and overlaying the advertisement object and one of the image objects onto the program guide via the receiver.

41. The method of claim 33, further comprising receiving at the receiver an update list and using the update list to manage via the receiver the advertisement object received at the receiver and cached advertisement objects previously stored in the receiver.

42. The method of claim 41, wherein managing via the receiver the advertisement object received at the receiver includes storing in the receiver the advertisement object based on the update list.

43. The method of claim 41, wherein managing via the receiver the cached advertisement objects includes discarding at least some of the cached advertisement objects from the receiver based on the update list.

44. The method of claim 33, wherein a first one of the image objects is a non-animated graphic requiring the receiver to have a processing capability to render the non-animated graphic, and wherein a second one of the image objects is an animated graphic requiring the receiver to have a processing capability to render the animated graphic.

* * * * *